Jan. 4, 1949.     C. G. SONTHEIMER     2,458,310
DIRECTION FINDER
Filed Sept. 13, 1945
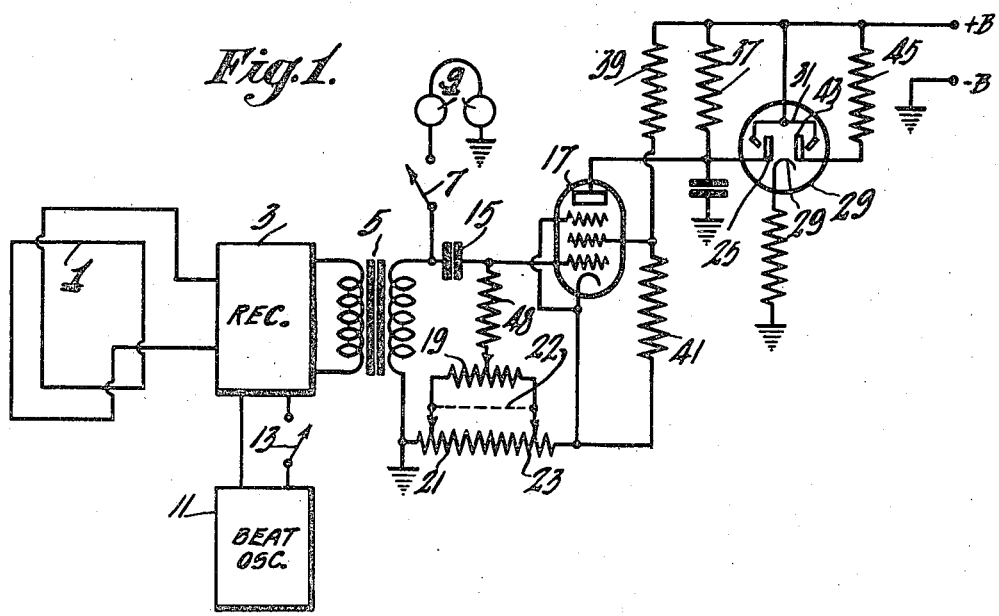
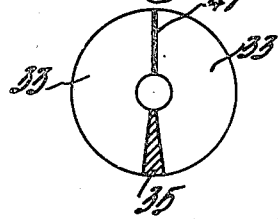
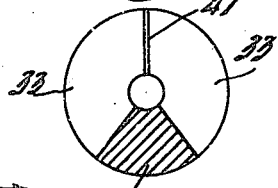
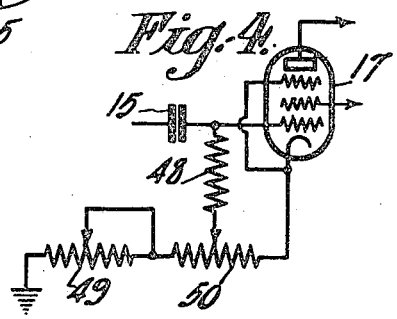
INVENTOR.
Carl G. Sontheimer
BY
CD Duska
ATTORNEY Patented Jan. 4, 1949

2,458,310

UNITED STATES PATENT OFFICE 2,458,310

DIRECTION FINDER

Carl G. Sontheimer, Stamford, Conn., assignor to Radio Corporation of America, a corporation of Delaware Application September 13, 1945, Serial No. 616,064

3 Claims. (Cl. 343—113)

This invention relates to radio direction finding and more particularly to improvements in the art of determining direction by means of null indications. It is well known practice to determine the direction of arrival of a radio wave by means of a rotatable loop or other antenna exhibiting an axis of zero response. The antenna is rotated to a position such that a radio receiver connected to it produces no output. The axis of zero response is then parallel to, and an indication of, the direction of wave arrival.

Ordinarily, but not always, the zero receiver output or null is indicated aurally by means of a loudspeaker or headphones. Various types of visual null indicators are available. Many of these include a current meter or voltmeter of conventional construction. Such meters are expensive and fragile, and may exhibit inertia effects which are particularly troublesome under conditions of vibration or acceleration such as are encountered in aircraft, or during reception of code modulated carrier wave signals.

It is the principal object of the present invention to provide an improved method of and means for null indication in direction finders of the described type.

Another object of this invention is to provide an improved visual null indicator system which may be used with a conventional aural-null direction finder without requiring circuit changes in the receiver, or internal connections thereto.

A further object is to provide an improved direction finder system including a visual null indicator system which after initial adjustment need not be adjusted in accordance with signal level to provide satisfactory off-null indications.

The invention will be described with reference to the accompanying drawing, in which Figure 1 is a schematic diagram of a direction finder system embodying the invention, Figures 2 and 3 show typical indications provided by the system of Figure 1, and Figure 4 is a diagram of a modification of the circuit of Figure 1.

Referring to Figure 1, a preferred embodiment of the invention includes a direction finder of the aural-null indicating type, comprising a loop antenna 1 connected to a radio receiver 3, whose output circuit is coupled through a transformer 5 and a switch 7 to a pair of headphones 9.

In accordance with usual design practice, the receiver 3 is provided with a local beat oscillator 11, arranged to operate at a frequency slightly (e. g. 1000 cycles per second) different from that of the signal applied to the second detector in the receiver 3. A switch 13 is provided for disconnecting the oscillator 11 when it is desired to use the system for reception of a modulated carrier, for example for communication or identification purposes. The beat oscillator is usually structurally combined with the rest of the direction finder receiver, although it is shown as a separate unit in Figure 1.

The secondary of the transformer 5 is coupled through a blocking capacitor 15 to the control grid of an electron discharge tube 17, which is preferably of the sharp cut off pentode type, such as that commonly designated in the radio art as a 6SJ7. The cathode of the tube 17 is connected to the midpoint of the voltage divider formed by the fixed resistors 39 and 41 and the variable resistors 21, 19, and 23, all of which are connected in series. The upper leg of this voltage divider, consisting of the resistors 39 and 41 in series, is connected to the positive B supply of the null indicator. The screen grid of tube 17 is connected to the junction of these resistors 39 and 41. The lower leg of this voltage divider, consisting of the variable resistors 21, 19 and 23 is connected through ground to the negative B supply of the null indicator. The variable resistors 21 and 23 are ganged together, as indicated by the dashed line 22, in such fashion that the resistance of the lower leg of the voltage divider remains constant when resistors 21 and 23 are varied. A positive potential is maintained at the cathode of tube 17 by this voltage divider.

The control grid of tube 17 is connected through the grid-leak resistor 48 to the variable tap of resistor 19, and the potential of this grid is thereby rendered negative with respect to the cathode by the voltage drop between the cathode and the variable tap of resistor 19.

The anode of the tube 17 is connected directly to one of the ray control electrodes 25 of a so-called "electron ray indicator" tube 27 which is preferably of the type designated as a 6AF6G. The tube 27 includes a cathode 29, the ray control electrode 25, and a fluorescent target 31. The target 31 is shaped to present a ring-shaped appearance when viewed end-on, as shown in Figure 2. The major portion 33 of the ring is luminous, while a smaller portion 35 looks like a shadow. The angle subtended by the shadow portion 35 depends on the voltage at the control electrode 25, being greatest when the electrode voltage is lowest.

The target 31 of the tube 27 is connected to the positive terminal of a D. C. "B" supply. The ray control electrode 25 and the anode of the tube 17 are also connected to the positive "B" terminal through a load resistor 37.

The above mentioned 6AF6G type indicator tube includes a second ray control electrode 43, This is not used in the present system, but is connected to plus "B" through a resistor 45. The resistor 45 is of such value that the voltage on the electrode 43 is sufficient to substantially close the corresponding shadow, as indicated by the line 47 in Figure 2.

In the operation of the described system, a signal picked up by the loop I is heterodyned in the receiver 3 with the output of the oscillator 11, detected, and the resulting audio beat signal is amplified. Variation in the amplitude of the audio output of the receiver as the loop is rotated gives an indication of the direction of signal arrival, as is well known in the art. This output is applied to the grid circuit of the tube 17 through the capacitor 15.

By manipulation of the control shafts of the voltage divider 19 and the resistors 21 and 23, the grid to cathode bias of tube 17 may be controlled. The bias is adjusted so that the tube 17 functions as a biased detector, with its anode current increasing with increase in amplitude of the alternating input voltage.

Since the anode current of the tube 17 increases with increase of amplitude of the audio output of the receiver 3, and vice versa, the voltage drop in the load resistor 37 is also proportional to the audio voltage. Thus the voltage at the anode of the tube 17 decreases with increase in amplitude of the receiver output and increases with decrease of receiver output, being highest when no signal is applied to the receiver.

The voltage at the ray control electrode 25 of the tube 27 is at all times equal to that at the anode of the tube 17. Thus the shadow angle 35 is smallest when the receiver output is zero. The resistors 18, 21 and 23 are preferably adjusted to substantially close the shadow portion 35 on noise, with gain of the receiver set at the desired level for the signal to be received. This may be accomplished by tuning in the desired signal, setting the receiver gain control at the desired level, then detuning the receiver just sufficiently to lose the signal, and finally by adjusting resistors 19, 21 and 23 for closure of the shadow. Resistor 19 is preferably much smaller than resistors 21 and 23, and acts as a fine control on this adjustment.

After the receiver 3 has been tuned to the transmitter whose bearing is to be determined, the switch 13 may be opened and the switch 7 closed to enable the operator to identify the transmitter by the way it is keyed or otherwise characteristically modulated. The switch 13 is then closed to connect the beat oscillator 11 to the receiver, which then provides a 1000 cycle output voltage proportional in amplitude to the carrier at the input to the receiver. The resistors 19, 21 and 23 are then adjusted as in the preceding paragraph, and the receiver returned to the signal. The shadow angle on the indicator tube 27 opens up accordingly, presenting the appearance of Figure 3.

The operator rotates the loop I, observing the tube 27, until the shadow 35 closes to its minimum width. The axis of the loop I is then in the line of the bearing of the transmitter.

Unlike a meter type visual null indicator, the tube 27 cannot be damaged or driven "off scale" by high amplitude signals such as appear when the loop I is in a position far from the null. It is characteristic of the described type of electron ray indicator to gradually decrease in angular sensitivity as the shadow angle increases. Thus there is no definite limit at which the indicator goes "off scale," i. e. where a further increase in input will cause no further increase in the shadow angle. This is of great advantage in the present system, since no manual adjustment of the receiver gain or of the indicator sensitivity is required as the loop is rotated from a position of relatively large signal pickup to the null position.

The described indicator system is readily adapted to use with substantially any conventional type of preexisting aural null direction finder, since no circuit changes are required within the receiver. A beat oscillator is required; however, this is usually already provided in direction finder receivers.

Other embodiments of the invention will be apparent to those skilled in the art. For example, resistor 19 may be omitted, or its function accomplished as shown in the circuit of Figure 4. Here resistors 19, 21 and 23 are replaced by resistors 49 and 50. Resistor 50 is much smaller than resistor 49, and serves as a fine adjustment on the position of the variable tap of this resistor.

I claim as my invention:

1. In combination with directional radio receiver means, a local oscillator connected to said receiver means to cause said receiver to produce a beat frequency output voltage in response to signal received by said receiver means, an audio frequency detector, means for applying said beat frequency voltage to said detector, electron ray indicator means including a fluorescent electrode, means providing a beam of electrons impinging on said electrode to produce a luminous image thereon, and an electrode for controlling the size of said image connected to the output circuit of said detector.

2. In a radio direction finder system including a directional antenna, a radio receiver connected to said antenna, and beat oscillator means coupled to said receiver, an audio frequency detector including at least an anode, a cathode, and a control grid, means for applying the output of said receiver to said control grid, adjustable bias means connected to said control grid, and electron ray indicator means including a fluorescent element, a source of electrons to impinge on said element and produce a luminous image thereon, and an electrode for controlling the size of said image connected to said anode of said detector.

3. In combination with a directional radio receiver including beat oscillator means, an electron discharge tube including at least a control grid, an anode and a cathode, means for adjustably biassing said control grid with respect to said cathode, and means for applying the output of said receiver to said control grid, further electron discharge tube means including a cathode, a fluorescent target, and a control electrode interposed between said target and said cathode, and means connecting said anode of said first-mentioned electron discharge tube directly to said control electrode of said second discharge tube.

CARL G. SONTHEIMER.

REFERENCES CITED

The following references are of record in the file of this patent:

UNITED STATES PATENTS

| Number | Name | Date |
|---|---|---|
| 2,189,300 | Roberts | Feb. 6, 1940 |
| 2,226,929 | Hefele | Dec. 31, 1940 |